US011802930B2

(12) United States Patent
Knaappila

(10) Patent No.: US 11,802,930 B2
(45) Date of Patent: Oct. 31, 2023

(54) SYSTEMS AND METHODS FOR MULTIANTENNA ORIENTATION AND DIRECTION DETECTION

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 17/464,374

(22) Filed: Sep. 1, 2021

(65) Prior Publication Data
US 2021/0396830 A1 Dec. 23, 2021

Related U.S. Application Data

(63) Continuation of application No. 15/663,326, filed on Jul. 28, 2017, now Pat. No. 11,125,848.

(51) Int. Cl.
| H04W 4/00 | (2018.01) |
| G01S 3/14 | (2006.01) |
| H04W 64/00 | (2009.01) |
| G01S 3/02 | (2006.01) |
| G01S 3/04 | (2006.01) |
| G01S 5/02 | (2010.01) |

(Continued)

(52) U.S. Cl.
CPC .............. *G01S 3/143* (2013.01); *G01S 3/023* (2013.01); *G01S 3/043* (2013.01); *G01S 3/48* (2013.01); *G01S 5/0226* (2013.01); *G01S 5/0242* (2013.01); *G01S 5/0247* (2013.01); *H04W 64/003* (2013.01); *G01S 3/12* (2013.01); *G01S 5/06* (2013.01)

(58) Field of Classification Search
CPC ............... H04W 64/003; H04W 16/28; H04W 4/026; G01S 3/48; G01S 3/143
See application file for complete search history.

(56) References Cited

U.S. PATENT DOCUMENTS 5,148,180 A 9/1992 Beyer et al.
6,288,672 B1 9/2001 Asano et al.
(Continued)

FOREIGN PATENT DOCUMENTS

WO 2013126747 8/2013

OTHER PUBLICATIONS

Gunhardson, "Indoor Positioning Using Angle of Departure Information", 2015, 86 pgs.
(Continued)

*Primary Examiner* — Omoniyi Obayanju
(74) *Attorney, Agent, or Firm* — Egan, Enders & Huston LLP

(57) ABSTRACT

Systems and methods are provided to simultaneously determine both angle of arrival (AoA) and angle of departure (AoD) of a signal transmitted between two or more radio frequency (RF)-enabled wireless devices (e.g., such as BLE modules). The disclosed systems and methods may be so implemented in one embodiment to determine AoD even in the case where the transmitting wireless device is at the same time operating in a departure (or AoD) transmitting mode by transmitting a RF signal from multiple antenna elements of at least one switched antenna array using a given switching pattern or sequence implemented by an array switch.

30 Claims, 6 Drawing Sheets

(51) Int. Cl.
*G01S 3/48* (2006.01)
*G01S 3/12* (2006.01)
*G01S 5/06* (2006.01)

(56) References Cited

U.S. PATENT DOCUMENTS

| | | | |
|---|---|---|---|
| 8,723,729 | B2 | 5/2014 | Desai et al. |
| 8,965,284 | B2 | 2/2015 | Honkanen et al. |
| 10,440,570 | B2 | 10/2019 | Knaappila |
| 10,492,050 | B2 | 11/2019 | Knaappila |
| 11,125,848 | B2 | 9/2021 | Knaappila |
| 2005/0267715 | A1 | 12/2005 | Kolu et al. |
| 2009/0098838 | A1* | 4/2009 | Guo .............. H04B 7/0617 455/101 |
| 2012/0256726 | A1 | 10/2012 | Honkanen et al. |
| 2014/0321321 | A1 | 10/2014 | Knaappila |
| 2015/0271628 | A1 | 9/2015 | Knaappila |
| 2015/0319600 | A1 | 11/2015 | Knaappila |
| 2016/0047885 | A1 | 2/2016 | Wang et al. |
| 2017/0131381 | A1* | 5/2017 | Malik .............. H04W 64/006 |
| 2017/0227623 | A1* | 8/2017 | Park .............. G01S 3/46 |

OTHER PUBLICATIONS

Dhope, "Application of Music, Esprit and Root Music in DOA Estimation", University of Zagreb, 2010, 5 pgs.

Xiong et al., "SecureAngle: Improving Wireless Security Using Angle of Arrival Information", ACM, 2010, 6 pgs.

Gotsis et al., "Multiple Signal Direction of Arrival (DOA) Estimation for a Switched Beam System Using Neural Networks", Piers Online, vol. 3, No. 8, 2007, 5 pgs.

Gustafsson et al., "Positioning Using Time Difference of Arrival Measurements", Department of Electrical Engineering, Linkoping University, 4 pgs., (This reference was available prior to the Jul. 28, 2017 filing date of U.S. Appl. No. 15/663,326, to which the current patent application claims priority).

Cisco Connect, Tomorrow Starts here, Delivery Location Based Services With Cisco Enterprise Mobility Services Platform, Feb. 2015, 69 pgs.

* cited by examiner

SYSTEMS AND METHODS FOR MULTIANTENNA ORIENTATION AND DIRECTION DETECTION

This application is a continuation of U.S. patent application Ser. No. 15/663,326 filed on Jul. 28, 2017 and entitled "Systems And Methods For Multiantenna Orientation and Direction Detection", which is incorporated herein by reference in its entirety for all purposes.

FIELD

The disclosed systems and methods relate to wireless communication and, more particularly, to wireless signal direction detection.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited to only those, but increasingly more new application utilizing BLE technology are designed. Specifications for BLE are defined in Bluetooth 4.x (such as Bluetooth 4.0, 4.1, 4.2) and Bluetooth 5 core version specification by the Bluetooth Special Interest Group (SIG).

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertisement packets which the master device (also known as scanner device, i.e. "scanner") is scanning. Depending on the type of advertisement packet sent by an advertiser device, the scanner device may respond to the received advertisement packet by requesting a connection with the advertiser device, or may respond by requesting further information from the advertiser device. Beacons are a particular type of BLE advertiser device that transmit advertisement packets with a unique identifier to nearby portable electronic devices such as smart phones. An application on a portable electronic device may respond to information within an advertisement packet received from a beacon by performing an action, such as approximating the location of the portable device. After an advertiser device and scanner device become connected as master and slave, the master device may request bonding with the slave device. This means that the devices exchange long term keys or other encryption info to be stored for future connections. In another case, the master device may request pairing with the slave device, in which case the connection may be encrypted only for the duration of the current connection, during which short term keys are exchanged between the master device and slave device.

SUMMARY

Disclosed herein are systems and methods that may be implemented to simultaneously determine both angle of arrival (AoA) and angle of departure (AoD) of a signal transmitted between two or more radio frequency (RF)-enabled wireless devices (e.g., such as BLE modules). The disclosed systems and methods may be so implemented in one embodiment to determine AoD even in the case where the transmitting wireless device is at the same time operating in a departure (or AoD) transmitting mode by transmitting a RF signal from multiple antenna elements of at least one switched antenna array of the transmitting wireless device using a given switching pattern or sequence (e.g., round-robin sequence) implemented by an array switch.

In one embodiment, a receiving wireless device may be operated to use multiple antenna elements to receive a RF signal that is transmitted from multiple antenna elements of a transmitting wireless device to simultaneously determine both AoA and AoD of the received signal where there is no cooperation between the transmitting wireless device and receiving wireless device, and/or where a user of the receiving wireless device has no control over the signal transmission mode of the transmitting wireless device. In this regard, the transmitting device may be operating in AoD mode to transmit a RF signal from multiple antenna elements of a transmitting array having characteristics from which transmitted AoD may be determined by the receiving device, while the receiving device is receiving the RF signal at multiple antenna elements of a receiving array to determine AoA of the received signal. In one exemplary embodiment, the disclosed systems and methods may be so implemented to allow a receiving wireless device (e.g., such as a BLE scanner device) to determine the direction (from received signal AoA at the receiving device) and orientation (e.g., from determined AoD of the received signal as it is transmitted) of a transmitting wireless beacon device (e.g., such as BLE beacon device) that operates only as a beacon that does not accept BLE connections. In such a case, the position (indoor position, geolocation, etc.) of the receiving wireless device may be known (e.g., stored in non-volatile memory of the receiving wireless device, calculated by triangulation of signals received at the receiving wireless device, etc.).

In one embodiment, a wireless communication system may be provided that includes at least one wireless transmitting device configured with a multi-element switched antenna array of known configuration, and at last one wireless receiving device that is also configured with multi-element switched antenna array of known configuration. The wireless communication system may be operated to transmit a constant frequency RF signal from the wireless transmitting device while switching between the multiple switched antenna elements of its antenna array to change the phase of the transmitted signal, while the wireless receiving device is simultaneously operated to receive this transmitted constant frequency signal while switching between the multiple switched antenna elements of its antenna array to measure the phase difference or time difference of arrival (TDOA) of the transmitted constant frequency signal as it is received at each of the different elements of the receiving array from each of the different antenna elements of the transmitting array.

In the above embodiment, the wireless receiving device may be configured to then determine the AoA of the transmitted constant frequency signal (or direction to the transmitting device) from the measured phase difference or TDOA of the constant frequency signal transmitted from one of the antenna elements of the transmitting array as it is received by the multiple different antennal elements of the receiving array, while at the same time utilizing the known configuration of the antenna elements of the transmitting wireless device to determine the AoD of the same constant frequency transmitted signal (from which orientation of the transmitting device may be determined) from the measured phase difference or TDOA of the received signal as it is received by one or more of the antenna elements of the receiving array from the multiple antenna elements of the transmitting array.

In one respect, disclosed herein is a method, including: receiving a first wireless signal from a second wireless device at multiple antenna elements of a first wireless device while switching reception between the multiple antenna elements one at a time during at least a portion of a time duration of the reception of the first wireless signal; and determining an angle of departure (AoD) of the first wireless signal from the second wireless device based on one or more characteristics of the received first wireless signal.

In another respect, disclosed herein is an apparatus, including at least one processing device coupled to radio circuitry and configured to be coupled to multiple antenna elements as a first wireless device, the at least one processing device being programmed to control the first wireless device to: receive a first wireless signal from a second wireless device at the multiple antenna elements of the first wireless device while switching reception between the multiple antenna elements of the second wireless device one at a time during at least a portion of a time duration of the reception of the first wireless signal; and determine an angle of departure (AoD) of the first wireless signal from the second wireless device based on one or more characteristics of the received first wireless signal.

In another respect, disclosed herein is a method, including: transmitting a first wireless signal from multiple different antenna elements of a second wireless device during multiple different time slots according to a round-robin sequence that repeatedly cycles through the multiple antenna elements of the second wireless device to transmit from one antenna element of the second wireless device at a time in the same order during each cycle of the sequence; receiving the first wireless signal from the second wireless device at multiple antenna elements of a first wireless device while switching reception between the multiple antenna elements of the first wireless device one at a time during at least a portion of a time duration of the reception of the first wireless signal; and determining an angle of departure (AoD) of the first wireless signal from the second wireless device based on one or more characteristics of the received first wireless signal.

In another respect, disclosed herein is a system, including: a first apparatus including at least one processing device coupled to radio circuitry that is coupled to multiple antenna elements as a first wireless device; a second apparatus including at least one processing device coupled to radio circuitry that is coupled to multiple antenna elements as a second wireless device, the at least one processing device of the second apparatus being programmed to control the second wireless device to transmit a first wireless signal from multiple different antenna elements of the second wireless device during multiple different time slots according to a round-robin sequence that repeatedly cycles through the multiple antenna elements to transmit from one antenna element of the second wireless device at a time in the same order during each cycle of the sequence. The at least one processing device of the first wireless device may be programmed to control the first wireless device to: receive the first wireless signal from the second wireless device at the multiple antenna elements of the first wireless device while switching reception between the multiple antenna elements of the first wireless device one at a time during at least a portion of a time duration of the reception of the first wireless signal; and determine an angle of departure (AoD) of the first wireless signal from the second wireless device based on one or more characteristics of the received first wireless signal.

DESCRIPTION OF ILLUSTRATIVE EMBODIMENTS

Figure 1:
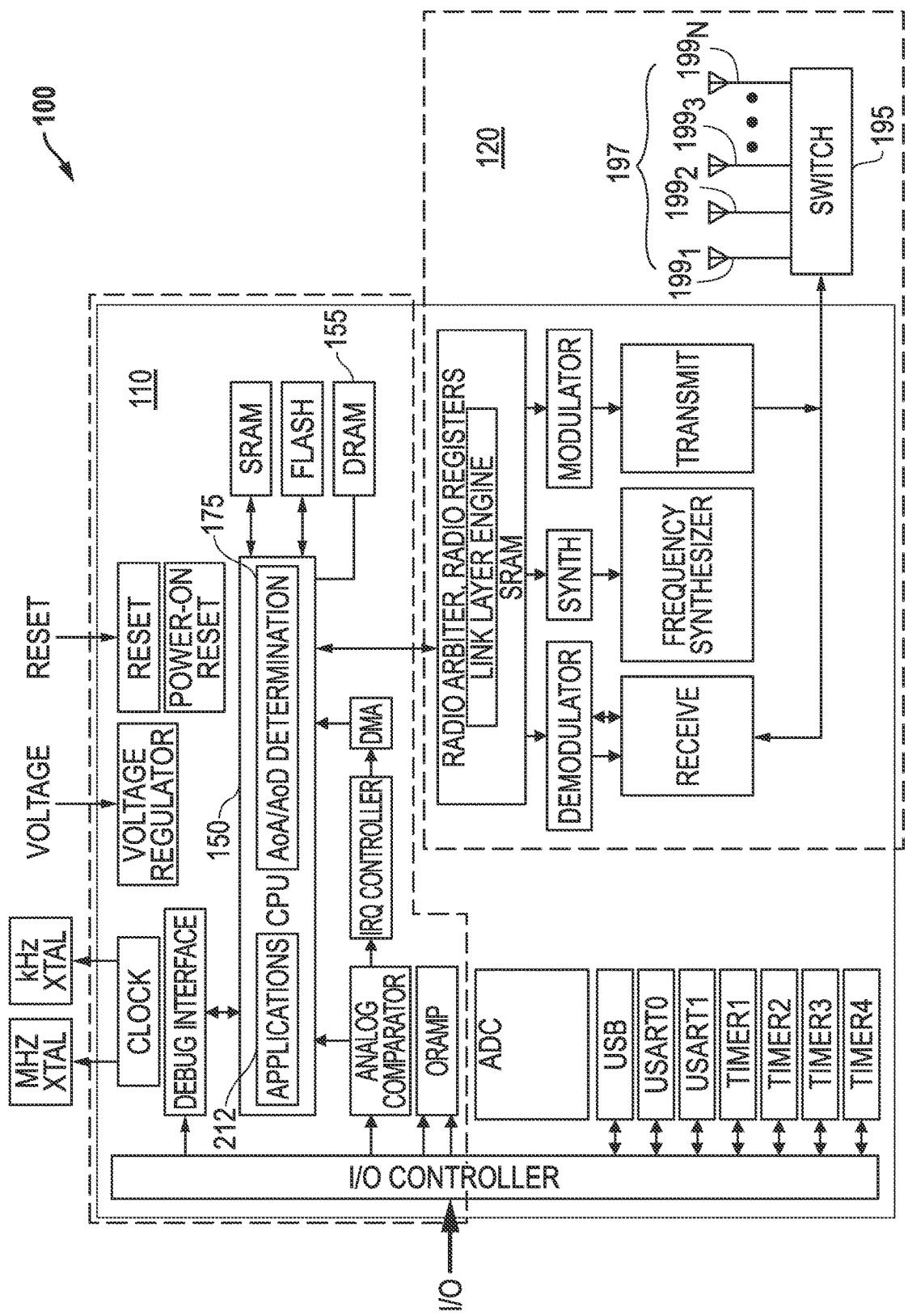
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods. In one exemplary embodiment, components of BLE module 100 may be implemented as a system on a chip (SoC) which supports multiple antennas, or alternatively includes multiple antennas. As shown, BLE module 100 includes a first module segment 110 that includes one or more central processing units (CPUs), processors or other programmable integrated circuits 150 and memory 155 (e.g., DRAM) with application data. As shown, application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting RF-enabled devices across different wireless connections (e.g., such as different BLE wireless connections between different BLE devices). In one embodiment, CPU 150 may be programmed to utilize AoA and/or AoD information determined as described herein for one or more purposes, for example, to restrict bonding or pairing with other BLE devices in a manner described in U.S. patent application Ser. No. 15/387,004 filed on Dec. 21, 2016, which is incorporated herein by reference in its entirety for all purposes. In another example, determined AoD information for wireless signals received at BLE module 100 from multiple different AoD transmitting devices may be utilized to determine a position of receiver BLE module 100, and AoA information in combination with AoD information of a wireless signal received at BLE module 100 may be utilized to solve for both position and orientation of receiver BLE module 100, e.g., for indoor navigation use cases.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

In one embodiment, second module segment 120 may be configured to determine both angle of arrival (AoA) and angle of departure (AoD) of a signal received from another wireless device (e.g., such as a BLE device). For example, multiple antenna elements $199_1$ to $199_N$ of second module segment 120 may be configured as a switched antenna array 197 that is coupled to processing components of second module 120 that are programmed to determine AoA of a signal transmitted by a similar switched antenna array of another device by measuring amplitude and/or phase of the signal transmitted by at least one given antenna element 199 of the other device as it is received at each antenna element 199 in the antenna array of the receiving device, and to determine AoD of the received signal by measuring amplitude and/or phase of the signal transmitted by each of the multiple antenna elements $199_1$ to $199_N$ of the transmitting device as it is received at at least given one antenna element 199 in the antenna array 197 of the receiving device.

In one embodiment, an AoA of a wireless signal that is transmitted by a switched antenna array 197 of a transmitting BLE module 100 may be determined at a receiving BLE module 100 by using an antenna switching pattern at the receiving BLE module 100 that is selected to allow determination of AoA of the received wireless signal as it is transmitted by a single one of the transmitting device antenna elements 199 of the transmitting BLE module 100 and received at each of the multiple antenna elements 199 of receiving BLE module 100, e.g., receiving device switching pattern may be timed and sequenced relative to transmitting device switching pattern to switch each of receiving device antenna elements 199 so that it receives the transmitted signal from the same single transmitting device antenna element 199 from which the other receiving device antenna elements 199 also receive the transmitted signal. Likewise, an AoD of a wireless signal transmitted by a switched antenna array 197 of a transmitting BLE module 100 may be determined at a receiving BLE module 100 by using an antenna switching pattern at the receiving BLE module 100 that is selected to allow determination of AoD of the received wireless signal as it is received by a single one of the receiving device antenna elements 199 of the receiving BLE module 100 from each of the multiple transmitting antenna elements 199 of the transmitting BLE module 100, e.g., receiving device switching pattern timed and sequenced relative to transmitting device switching pattern to switch receiving device antenna elements 199 so that one of the receiving device switching elements 199 receive the transmitted signal from each of the multiple transmitting device antenna elements 199.

In yet another embodiment, an algorithm may be implemented by a receiving BLE module 100 to combine multiple received signal samples to solve for AoA and AoD of a wireless signal that is transmitted by multiple transmitting antenna elements 199 of a transmitting BLE module antenna array 197 and received by multiple receiving antenna elements 199 of the receiving BLE module antenna array 197, i.e., to allow calculation of AoA of a wireless signal transmitted from multiple transmitting antenna elements 199, and/or to allow calculation of AoD from a wireless signal received at multiple receiving antenna elements 199.

In the embodiment of FIG. 1, processing components (e.g., such as demodulator or receiver component of a baseband processor) of second module 120 may be configured to sample a received signal and provide sample data AoA/AoD determination 175 that may be implemented by CPU 150 in first module segment 110 to perform AoA and AoD determination. In this regard, AoA of the received signal may be determined using any suitable technique, e.g., such as by using time difference of arrival (TDOA) techniques to measure the delay, or to measure difference in received phase, of the received signal at each antenna element 199 in the antenna array 197 relative to another antenna element/s 199 in the antenna array 197 and which may include, for example, using switch 195 to switch through the different elements $199_1$ to $199_N$ of the array to sample and measure phase difference of the received signal at the different elements 199. At least a portion of such a received signal may be constant frequency to aid measurement of phase shift or TDOA between antenna elements of the array as will be described further herein. In some embodiments direction of arrival (DOA) processing techniques such as MUltiple Signal Classification (MUSIC), Estimation of Signal Parameters Via Rotational Invariance Techniques (ESPRIT), etc. may be employed depending on the particular system configuration. It will be understood that in one embodiment, phase shift of a received signal may be performed by demodulator or receiver of a baseband processor of second module segment 120, and this determined phase shift information then passed upwards to AoA/AoD determination logic 175 implemented in a higher layer of BLE module 100 for AoA determination. AoD determination of a signal received at the wireless device 100 of FIG. 1 from another similar wireless device 100 may also be calculated by AoA/AoD determination logic 175 of first module segment 110 based on the measured phase shift of the received RF signal that occurs during transmission from multiple antenna elements $199_1$ to $199_N$ of the other wireless device, e.g., using similar algorithm/s as used to determine AoA.

Figure 2:
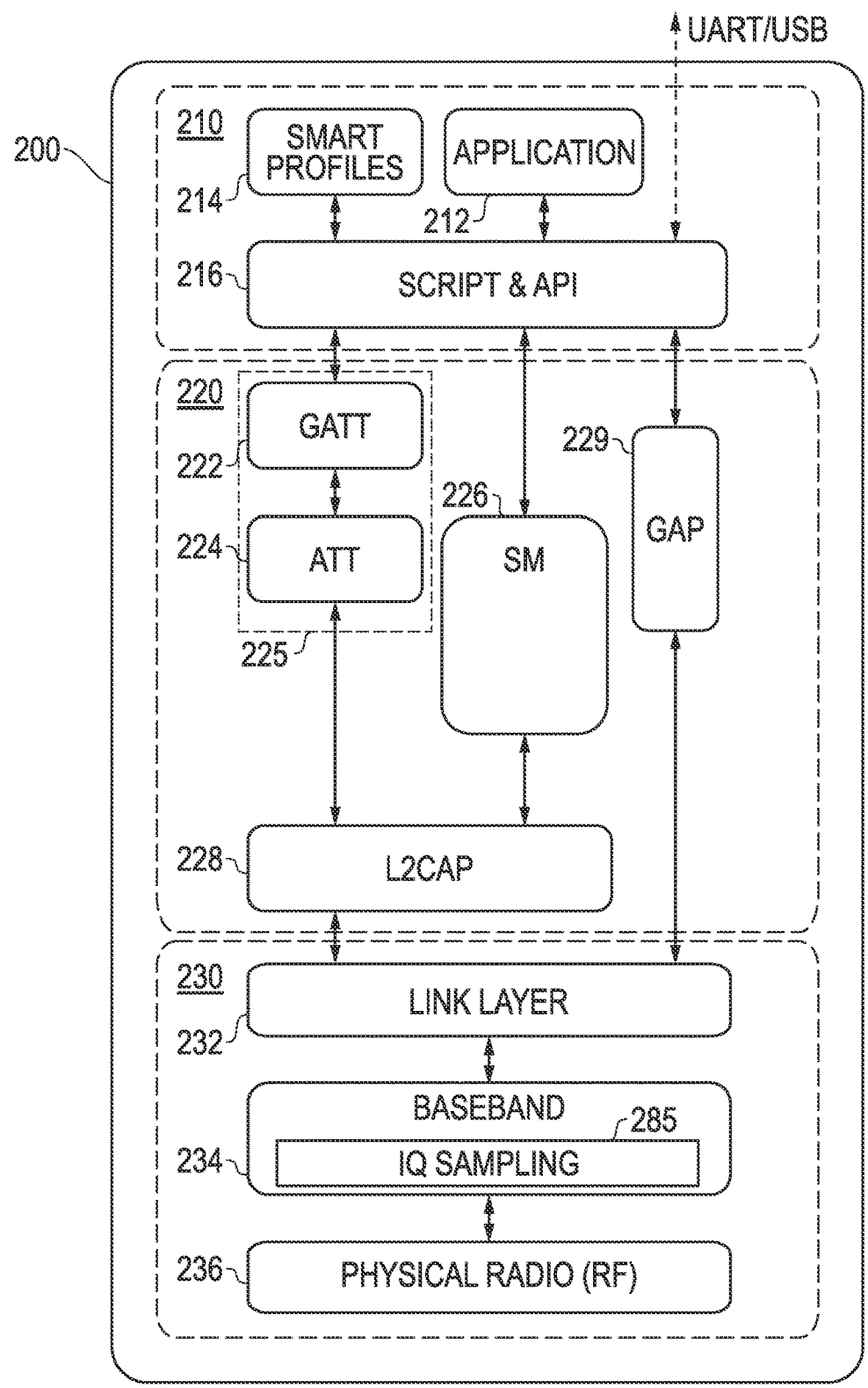
FIG. 2 is a simplified illustration of components of a Bluetooth smart module according to one exemplary embodiment of the disclosed systems and methods.

FIG. 2 is a simplified illustration of application, host and BLE control components of a Bluetooth smart module 200 configured according to one exemplary embodiment of the disclosed systems and methods. Although a Bluetooth smart module is illustrated, it will be understood that the disclosed systems and methods may be implemented with other RF communication technologies, e.g., such as IEEE 802.15.4 (ZigBee), IEEE 802.11 (Wi-Fi), etc. Components of Bluetooth smart module 200 may be implemented, for example, using the hardware components of radio module 100 or any other suitable combination of radio hardware components.

As shown in FIG. 2, Bluetooth smart module 200 of this embodiment includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, etc.), smart profiles 214, and script and application programming interface (API) 216. Host layer 220 includes protocols running over the connection. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212. SM 226 is configured to utilize security manager protocol to manage authentication and encryption for pairing and bonding with other BLE devices, including generation and storage of encryption keys.

As further shown in FIG. 2, Bluetooth (or BLE) controller 230 also includes link layer 232, baseband 234, and physical layer 236 (i.e., physical radio, radio frequency RF). Link layer 232 is present to provide ultra-low power idle mode operation and device discovery (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in U.S. patent application Ser. No. 15/234,332 filed Aug. 11, 2016, which is incorporated herein by reference in its entirety for all purposes.

In the embodiment of FIG. 2, I/Q sampling 285 of Bluetooth (or BLE) controller 230 may measure I/Q samples of received wireless signals in predetermined time slots by, and controller 230 may pass this sampled information upwards to host layer 220 and/or application layer 210. In turn, AoA/AoD determination logic 175 of FIG. 1 may be implemented within application layer 210 and/or host layer 220 to convert these measured I/Q samples to direction information, e.g., using antenna array and/or switching pattern information stored in memory of BLE module 100. For example, AoD determination may be performed using transmitting device operation and/or configuration information that is maintained or stored in smart profiles 214 application layer 210 that may be accessed by AoA/AoD determination logic 175. Examples of such transmitting device operation and/or configuration information include, but are not limited to, transmit antenna array antenna element spacing (x, y, z coordinate spatial positions), radiation pattern, transmitting antenna array switching information (e.g., switching pattern and/or sequence and timing of individual antenna elements used during transmission), orientation vector of the transmitting BLE device and/or its antenna array while transmitting the wireless signal, etc. Such transmitting device information may be received from an AoA/AoD packet that is sent from the transmitting device, and/or may be predefined and stored in non-volatile memory of BLE module 100.

In one embodiment, AoA/AoD determination logic 175 may use the sampled I/Q data to determine AoA ($\alpha$) and AoD ($\theta$) of a wireless signal received from another BLE device that is broadcasting (e.g., as a beacon device) or that is requesting pairing or bonding with Bluetooth smart module 200 in a manner as described further herein. This determined AoA value ($\alpha$) and determined AoD ($\theta$) may then be utilized or further processed by one or more components of host layer 220, and/or one or more applications 212 of application layer 210. In one exemplary embodiment, a vector may be used to represent direction, and vector operations are used for calculation of angles. However, it will be understood that in other embodiments an angle (e.g., AoA, AoD, etc.) may be represented and/or calculated using any other suitable mathematical measurements and operations (e.g., using Cartesian, polar or other coordinates, Euler angles, rotation matrix, quaternions, sphere-sphere intersections, in-phase and quadrature components, etc.).

Figure 5:
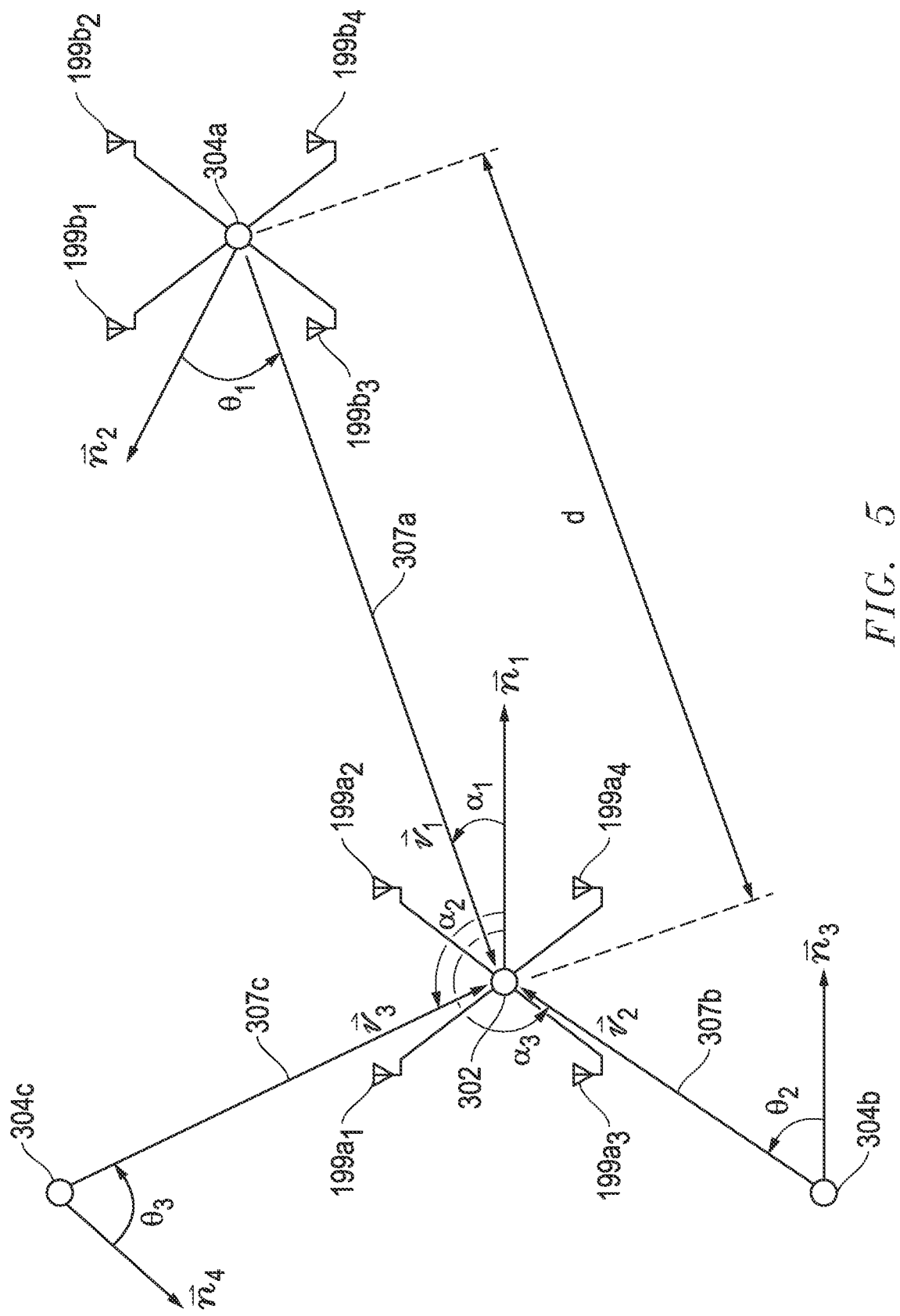
FIG. 5 illustrates multiple antenna elements of a wireless receiving device that is receiving a RF signal 307 from multiple antenna elements of a wireless transmitting device according to one exemplary embodiment of the disclosed systems and methods.

In one embodiment, the determined AoA/AoD information may be employed for indoor positioning or other type three-dimensional positioning of a receiving wireless device (receiving BLE module 100) using information from an indoor positioning profile 214, e.g., as illustrated in FIG. 5. In this regard, AoD vectors known from multiple AoD transmitters (other transmitting BLE modules 100) may be used by the receiving wireless device to determine its own indoor position. In such a case, position of each AoD transmitter may be known by the receiving wireless device (e.g., as geolocation or other location information that is pre-stored in the receiving wireless device non-volatile memory, that is transmitted in packet/s to the receiving wireless device from each transmitting wireless device, etc.). The receiving wireless device may also determine the AoD vector at which direction each receiving wireless device is in relation to the transmitting wireless device. The position of the receiving wireless device may be determined as the intersection point of these determined AoD vectors. AoA information for the received signals from the transmitting wireless devices may also be determined by the receiving wireless device and then combined with position of the receiving wireless device to determine the orientation of the receiving wireless device, e.g., relative to transmitting wireless device/s.

In one embodiment, application layer 210 of FIG. 2 may be capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other BLE-enabled devices across one or more connections. In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections. Although exemplary embodiments are illustrated and described herein in relation to Bluetooth smart module 200 of FIG. 2A, it will be understood that the disclosed systems and methods may be implemented to determine AoA and AoD using any other wireless device configuration.

Figure 3:
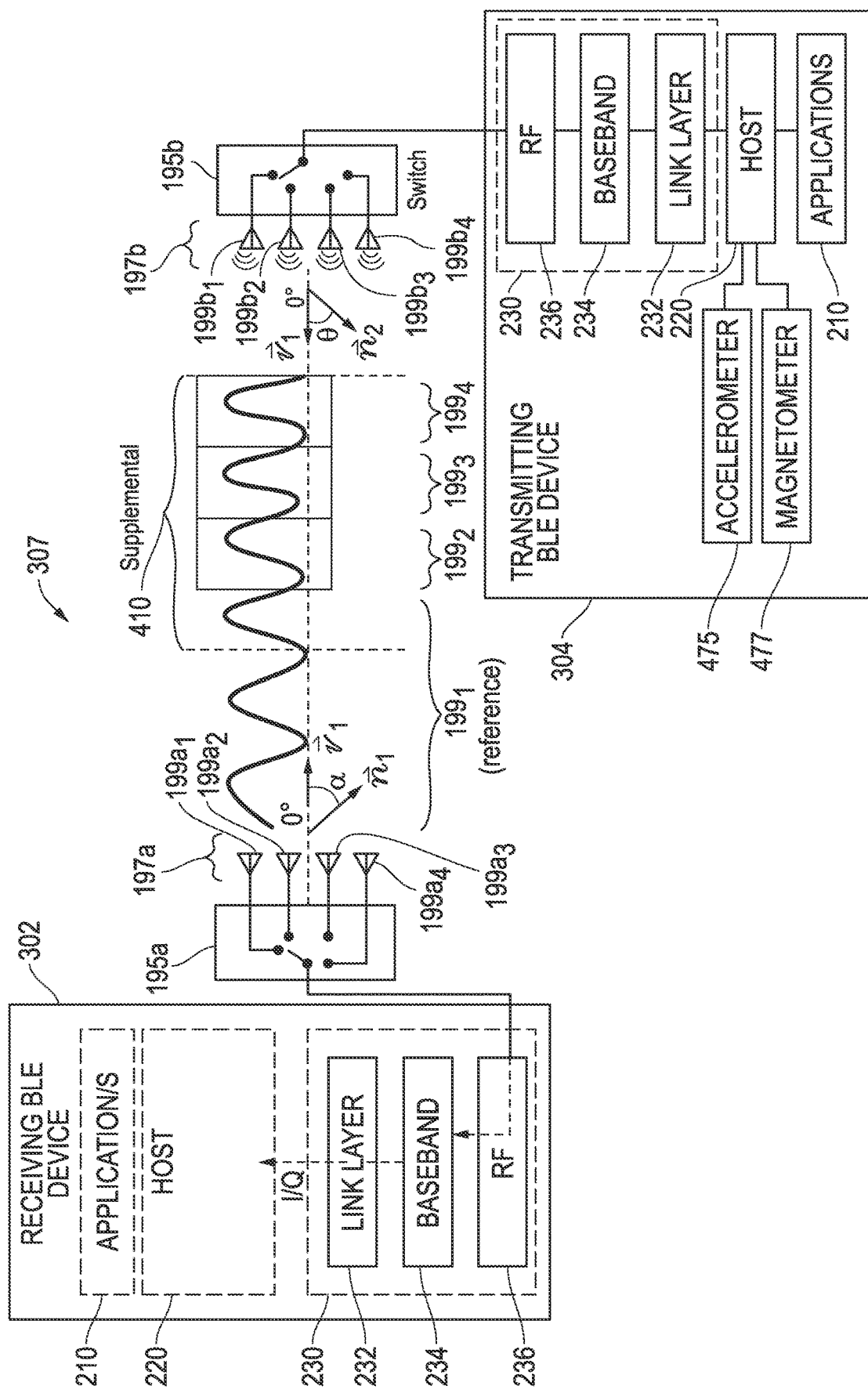
FIG. 3 illustrates a BLE device that is receiving a BLE signal transmitted from another BLE device according to one exemplary embodiment of the disclosed systems and methods.

FIG. 3 illustrates one exemplary embodiment of a receiving BLE device 302 that includes components of a Bluetooth smart module 200, including an antenna array 197*a* (having four antenna elements 199*a*₁ to 199*a*₄) that is receiving a BLE signal 307 transmitted from the antenna array 197*b* (having four antenna elements 199*b*₁ to 199*b*₄) of another transmitting BLE device 304 including components of a Bluetooth smart module 200 that is located within wireless communication signal range of BLE device 302. It will be understood that in other embodiments an antenna array 197 may include more or less than four antenna elements 199, and that it is possible that an antenna array of a receiving device 302 may have a different number of antenna elements 197 than does a transmitting device 304.

In one embodiment, BLE signal 307 may contain a Bluetooth (BLE) radio packet 400 that includes a constant frequency signal 410 in the supplemental information field of packet 400 at the end of the packet waveform 402 as illustrated in FIG. 4, and antenna switch 195*a* of receiving device 302 may switch reception between the individual antenna elements 199*a*₁ to 199*a*₄ of receiving array 197*a* (e.g., in round robin fashion as shown by the brackets in FIG. 3) in synchronization with switching between individual transmission elements 199*b*₁ to 199*b*₄ of transmitting array 197*b* during at least a portion of the duration of the constant frequency signal 410 of a supplemental information field of packet 400 so as to provide the received constant frequency signal 410 from one element 199*a* at time to RF physical layer 236 and then to baseband 234 as shown. For example, during receipt of constant frequency signal 410 of packet 400, antenna element 199*a*₁ may be switched to receive a first reference portion of constant frequency signal 410 as shown in FIG. 4. Then, the remainder of the antenna elements 199*a*₂ to 199*a*₄ may be switched one at a time to receive respective following portions of the same constant frequency signal 410 during the remainder of the supplemental information field of packet 400. Synchronization between the individual antenna elements 199*a*₁ to 199*a*₄ of receiving array 197*a* with switching between individual transmission elements 199*b*₁ to 199*b*₄ of transmitting array 197*b* is described further herein in relation to FIG. 6.

In the embodiment of FIG. 3, antenna elements 199*a* of receiving antenna array 197*a* may be configured with known spacing from each other such that the difference in the measured phase (or phase shift) or time of arrival of constant frequency signal 410 as it is received at the different elements is indicative of the vector ($\vec{v1}$) of the arriving signal 307 relative to a reference vector ($\vec{n1}$) which may be used to define the orientation of receiving device 302. In such an embodiment, reference vector ($\vec{n1}$) corresponds to the current orientation of a given BLE device 302 to which the direction of an incoming received signal is to be compared.

For example, reference vector ($\vec{n1}$) may be a fixed vector that corresponds to the centerline of the outgoing light beam emitted from a BLE-enabled overhead light fixture that includes BLE device 302, or may be a vector that extends outward from (and perpendicular to) the front surface of a refrigerator, etc. In this regard, it will be understood that a reference vector ($\vec{n1}$) may be defined as desired to extend relative to the BLE device 302 in order to correspond to, or otherwise indicate, the current orientation of a receiving BLE device 302. In one embodiment, receiving device 302 may optionally include sensor/s to allow BLE device 302 to determine its orientation in real time using real time input from these sensor/s. Examples of such sensors include accelerometer and magnetometer sensors which may be provided and configured to operate in similar manner as illustrated and described in relation to transmitting device 304 of FIG. 3.

Also illustrated in FIG. 3 is the 0° orientation vector of antenna array 197*a* which indicates the current physical orientation of the antenna array 197*a*, e.g., corresponding to the boresight of antenna array 197*a*. In the illustrated embodiment of FIG. 3, antenna 197*a* has of BLE device 302 has been pointed such that its 0° orientation vector corresponds to (is parallel to and aligned with) vector ($\vec{v1}$) of the arriving signal 307, and such that the physical orientation of antenna 197*a* has been positioned such that its 0° orientation vector is different than reference vector ($\vec{n1}$) of receiving device 302. However, it will be understood that in other embodiments reference vector ($\vec{n1}$) may be the same or parallel to the physical orientation of antenna array 197, and that antenna array 197 may be oriented freely relative to reference vector ($\vec{n1}$) such that the 0° physical orientation vector of antenna array 197*a* may or may not correspond to reference vector ($\vec{n1}$) of receiving BLE device 302. It will be understood that the illustrated configuration of antenna array 197*a* of FIG. 3 is exemplary only, and that the number of antenna elements within a given antenna array 197*a* may alternatively be greater or less than four. Additional information and examples regarding possible configurations of a receiving device reference vector relative to a measured incoming signal vector may be found in U.S. patent application Ser. No. 15/387,004 filed on Dec. 21, 2016, which is incorporated herein by reference in its entirety for all purposes.

It will be understood that the exemplary Bluetooth radio packet 400 of FIG. 4 is exemplary only, and that in other embodiments a vector ($\vec{v1}$) of an arriving signal may be determined by measuring phase shift or TDOA of received signals including Bluetooth (BLE) radio packets that do not have a constant frequency signal 410 waveform component. Moreover, it will be understood that switching between the individual antenna elements of array 197*a* may be performed in any manner suitable for determining phase shift or TDOA of a received signal. In this regard, switch 195*a* may operate to switch through all of antenna elements of array 197a during the duration of the receipt of a single incoming Bluetooth radio packet 410, and may or may not switch the individual antenna elements 199a so as to allow each antenna to receive the incoming signal for a duration of time that is equal to the receive duration of the other antenna elements.

Still referring to FIG. 3, components of BLE controller 230 may be configured to sample I/Q data and provide this information to higher layers (host layer 220 and/or application layer 210) for determination the arriving signal vector ($\vec{v1}$) by measuring the received signal phase shift at array 197a, and to then compute the AoA (α) from the difference between the received signal vector ($\vec{v1}$) and the reference vector ($\vec{n1}$) as shown. For example, in one embodiment the arriving signal vector ($\vec{v1}$) of signal/s received at receiving device 302 may be determined, e.g., by measuring the received signal phase shift or TDOA at elements of antenna array 197a. Then BLE receiving device 302 may compute the received signal AoA (α) based on the difference between the received signal vector ($\vec{v1}$) and the reference vector ($\vec{n1}$), e.g., such as solving for received signal AoA (α) using the below relationship or other suitable technique such as calculating the respective angles of vectors $\vec{v1}$ and $\vec{n1}$ and subtracting the difference. It will be understood that in other embodiments that BLE controller 230 may perform one or more of the above determinations, including determining receiving signal vector ($\vec{v1}$) from receive signal phase shift and/or computation of AoA (α) based on the difference between the received signal vector ($\vec{v1}$) and the reference vector ($\vec{n1}$).

$$\cos\alpha = \frac{\vec{v1}\cdot\vec{n1}}{|\vec{v1}|\cdot|\vec{n1}|}$$

In any case, the computed AoA (α) may then be provided to and/or used by components of host layer 230 and/or application layer 210, and indicates the direction to transmitting device 304 from receiving device 302.

As further shown in FIG. 3, receiving BLE device 302 may also be configured to determine angle of departure (AoD) of the received signal 307 transmitted from transmitting BLE device 304. As shown in FIG. 3, RF signal 307 is transmitted from at least one switched antenna array 197b of BLE device 304 using a given switching pattern or sequence implemented by array switch 195b to change phase of the transmitted signal 307. In this regard, transmitting BLE device 304 may transmit RF signal 307 while at the same time using switch 195b to select between different antenna elements $199b_1$, $199b_2$, $199b_3$ and $199b_4$ of array 197b to transmit the signal 464 one element at a time. At least a portion of RF signal 307 (e.g., at the end of a BLE packet or any other part of the signal) may be transmitted with a constant frequency and while using each of the multiple antenna elements $199b_1$, $199b_2$, $199b_3$ and $199b_4$ to transmit one at time during the constant frequency portion of the signal as shown by the brackets in FIG. 3. This results in a phase shift of RF signal 307 as it is received from the different transmitting elements $199b_1$ to $199b_4$ at receiving elements $199a_1$, $199a_2$, $199a_3$ and $199a_4$ of antenna array 197a of receiving BLE device 302.

In one embodiment of FIG. 3, sufficient sampling combinations of different transmit-receive antenna pairs may be established at receiving device 302 by switching during transmission of constant frequency signal 410 from transmitting device 304 to allow simple calculation of AoA and/or AoD. For example, each different one of the individual receiving antennas $199a_1$ to $199a_4$ may be switched and paired for alone receiving the signal 410 from the same individual transmitting antenna 197b during transmission of constant frequency signal 410 (e.g., by timing of reception between the individual antenna elements $199a_1$ to $199a_4$ of receiving array 197a relative to transmission of constant frequency signal 410 from multiple transmitting antenna elements $199b_1$ to $199b_4$ of transmitting array 197b) so that each of receiving antenna elements $199a_1$ to $199a_4$ receives the signal 410 from a common single one of the transmitting antennas 199b. In such a case, AoA may be determined from phase difference or TDOA of the transmitted constant frequency signal 410 as it is received at each of the different elements of the receiving array 197a.

Likewise, a selected one of receiving antenna elements 199a of receiving array 197a may be switched and paired for alone receiving the signal 410 from each of the multiple different transmitting antennas $199b_1$ to $199b_4$ of transmitting array 197b during transmission of constant frequency signal 410 (e.g., by timing of reception between the individual antenna element 199a of receiving array 197a relative to transmission of constant frequency signal 410) so that thee selected receiving antenna element 199a receives the signal 410 from each of the transmitting antenna elements $199b_1$ to $199b_4$ of transmitting array 197b. In such a case, AoD may be determined from measured phase difference or TDOA of the transmitted constant frequency signal 410 as it is received at selected single antenna element 199a of the receiving array 197a.

To illustrate, Table 1 below provides example switching patterns during separate synchronized time slots (e.g., 1 or 2 microsecond long time slots) according to one exemplary embodiment for a receiving device 302 which, for purposes of simplicity, includes a receiving array 197a that includes three receiving antenna elements $199a_1$ to $199a_3$ (rather than four). Synchronization between time slots of receiving device 302 and transmitting device 304 may be established, for example, as described below in relation to FIG. 4. In Table 1, the receiver switching pattern is relative to a round-robin AoD mode transmitting pattern from a transmitting device 304 having three transmitting antenna elements $199b_1$ to $199b_3$ (rather than four as illustrated in FIG. 3). As shown, there are two different receiving device antenna element switching patterns.

TABLE 1

Transmitting and Receiving Device Switching Patterns by Time Slot

| Time Slot Number | Transmitting Device Antenna Element Switching Sequence | Receiving Device Antenna Element Switching Sequence Number 1 | Receiving Device Antenna Element Switching Sequence Number 2 |
| --- | --- | --- | --- |
| 1 | $199b_1$ | $199a_1$ | $199a_1$ |
| 2 | $199b_2$ | $199a_2$ | $199a_2$ |
| 3 | $199b_3$ | $199a_3$ | $199a_3$ |
| 4 | $199b_1$ | $199a_1$ | $199a_2$ |
| 5 | $199b_2$ | $199a_2$ | $199a_1$ |

TABLE 1-continued

Transmitting and Receiving Device Switching Patterns by Time Slot

| Time Slot Number | Transmitting Device Antenna Element Switching Sequence | Receiving Device Antenna Element Switching Sequence Number 1 | Receiving Device Antenna Element Switching Sequence Number 2 |
|---|---|---|---|
| 6 | $199b_3$ | $199a_3$ | $199a_2$ |
| 7 | $199b_1$ | $199a_1$ | $199a_3$ |
| 8 | $199b_2$ | $199a_2$ | $199a_2$ |

As shown in Table 1, receiving device switching sequence number 1 has three different antenna phase differences sampled from each transmitter antenna element $199b_1$ to $199b_3$ by different respective receiving antenna elements $199a_1$ to $199a_3$, i.e., $199b_1$ sampled by $199a_1$, $199b_2$ sampled by $199a_2$ and $199b_3$ sampled by $199b_3$. This is similar to the synchronization pattern illustrated and described hereinbelow in relation to FIG. 6 for a transmitting array 197b and receiving array 197b that each includes four antenna elements. The measured phase differences at the different antennas may be used to calculate relative orientation of the receiving device 302 and transmitting device 304.

Table 2 below illustrates the sample measurements that are made between different combinations (pairs) of transmitting antenna elements 197b and receiving antenna elements 197a according to the receiving device antenna element switching sequence number 2 of Table 1 above. In Table 2, presence of an "x" indicates a signal transmitted by the indicated transmitting (TX) antenna element 197b that is received by the indicated indicated receiving (RX) antenna element 197a.

TABLE 2

Antenna Element Measurement Pairs For Switching Sequence 2

| | RX Antenna Element $199a_1$ | RX Antenna Element $199a_2$ | RX Antenna Element $199a_3$ |
|---|---|---|---|
| TX Antenna Element $199b_1$ | X | X | X |
| TX Antenna Element $199b_2$ | X | X | |
| TX Antenna Element $199b_3$ | | X | X |

As shown in the second row from the top of Table 2, all receiving (RX) Antenna elements $199a_1$ to $199a_3$ of the receiving device have received signal samples from the same common transmitting (TX) antenna element $199b_1$, from which received signal AoA may be determined. As shown in the second column from the right of Table 2, receiving (RX) antenna element $199a_2$ has received signal samples transmitted from all transmitting (TX) antenna elements $199b_1$ to $199b_3$, from which AoD may be determined. Thus, sample measurements made using switching sequence number 2 may be used to determine both AoA and AoD information, which may be combined to determine orientation of the receiving device. It will be understood that the exemplary transmitting and receiving switching patterns of Table 1 and the resulting measurement pairs of Table 2 are exemplary only. In this regard, other transmitting and receiving switching patterns, and combinations thereof, may be employed.

Returning to FIG. 3, in yet another embodiment, multiple received signal samples of constant frequency signal 410 from multiple receiving antennas $199a_1$ to $199a_4$ may be combined at receiving device 302 to solve for AoA and/or AoD of signal 410 that is transmitted by multiple transmitting antenna elements $199b_1$ to $199b_4$ of transmitting array 197b of transmitting device 304. For example, phase of the combined signal samples received at antennas $199a_1$ to $199a_4$ may be analyzed to separate out phase difference effects due to AoA and/or AoD of signal 410 as it is received at multiple switched receiving antenna elements $199a_1$ to $199a_4$ of receiving array 197a from multiple switched transmitting elements $199b_1$ to $199b_4$ of transmitting array 197b.

Figure 4A:
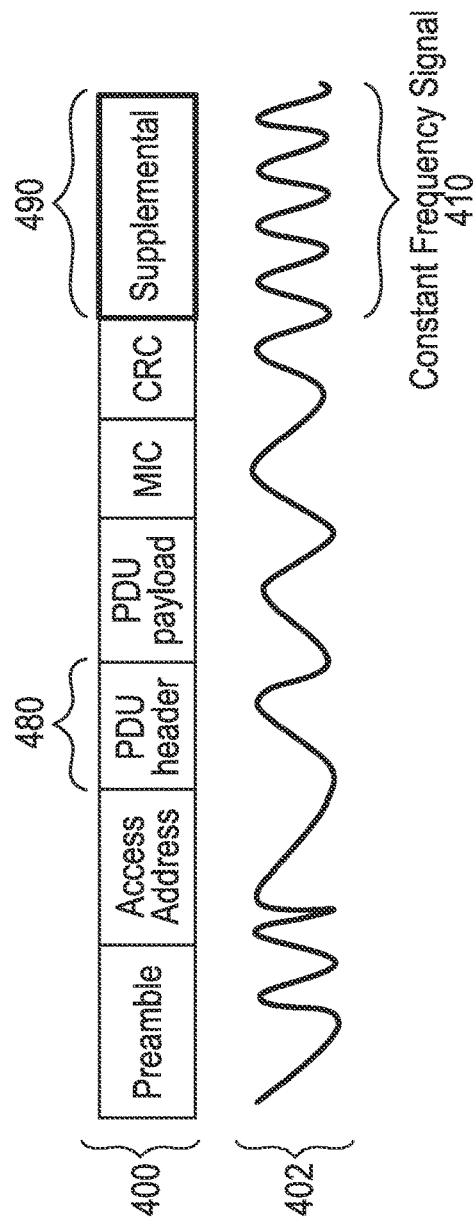
FIG. 4A shows a Bluetooth radio packet that may be employed in the practice of one exemplary embodiment of the disclosed systems and methods.
Figure 4B:
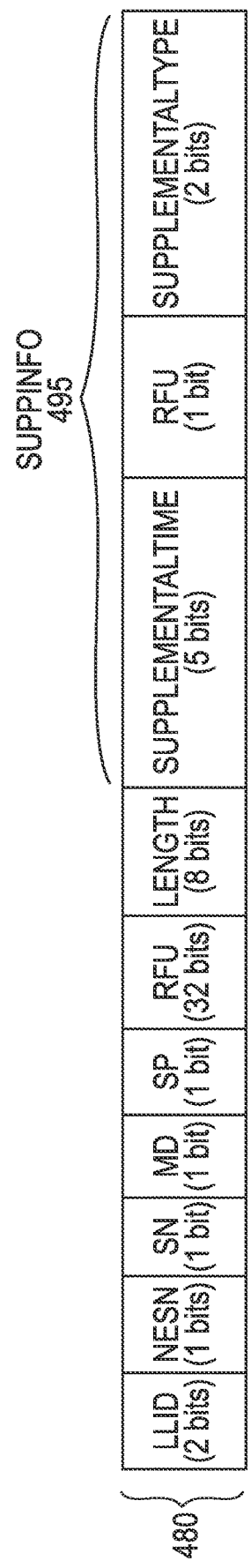
FIG. 4B shows a PDU header of a Bluetooth radio packet that may be employed in the practice of one exemplary embodiment of the disclosed systems and methods.

RF signal 307 that is transmitted from transmitting BLE device 304 may include one or more link layer packets 400 such as shown in FIG. 4A that each may include an optional 16-160 microsecond Supplemental field 490 at the end of the packet waveform 402 as illustrated in FIG. 4A, and during which transmitting device and/or receiving device synchronized switching occurs. BLE antenna synchronization information may be included in an optional supplemental information (SuppInfo) field 495 of PDU header 480 of link layer packet 400 as shown in FIG. 4B, with the presence of the SuppInfo field 495 in PDU header 480 being indicated by SP field bit=1. Presence of this supplemental information (SuppInfo) field 495 indicates presence of the following Supplemental field 490, and SuppInfo field 495 may itself include a SupplementalTime field as shown to define time length of the following Supplemental field 490 at the end of the packet, e.g., defined by two to twenty multiples of 8 μs units so that Supplemental field 490 may have a possible time length of from 16 μs to 160 μs. As shown, Supplemental information (SuppInfo) field 495 may also include a supplemental type (SupplementalType) field that defines the type of the supplemental field 490 to follow (e.g., no switching, AoA switching to occur at receiver only, AoD switching to occur at transmitter only, combined AoA and AoD switching to occur at both receiver and transmitter, etc.). In one embodiment, receiving BLE device 302 may always ignore the bit of the SupplementalType field and always switch through its own antenna elements $199a_1$ to $199a_4$ of receiving array 197a during signal reception.

Supplemental information (SuppInfo) field 495 may also include the slot switching times, i.e., a selected duration of transmitting and/or receiving switching slots for each receiving antenna element 199a and/or transmitting antenna element 199b during the supplemental field 490, depending on AoA and/or AoD determination operation that is occurring. For AoA and/or AoD determination, signal-transmitting time slots during supplemental field 490 may be used to control synchronized switching between respective transmitting antenna elements 199b of transmitting device 304 in time alignment with switching of corresponding receiving antenna elements 199a of receiving device 490 in the manner shown in Tables 1 and 2.

In one embodiment, BLE switching slots may be selected to be either 1 μs or 2 μs for each of receiving or transmitting from each of the separate antenna elements 199 of a respective array 197. In a further embodiment, antenna element switching may occur at a higher frequency, e.g., each 1 μs or 2 μs slot may be sampled by receiving antennas $199a_1$ to $199a_4$ at a higher frequency so as to allow each receiving antenna $199a_1$ to $199a_4$ to take a sample of a transmitted signal from the same single transmitting antenna 199b inside the same one 1 μs or 2 μs slot.

In one exemplary embodiment of the disclosed system and methods transmitting device 304 may always generate AoD-type transmissions in an AoD mode where round-robin type transmitting antenna switching happens as defined in Table 1, and this pattern may be operated to be compatible with existing single-antenna element receiver AoD implementations. However, a receiving device 302 may also switch through multiple antenna elements $199a_1$ to $199a_4$ to receive multiple phase samples from multiple pairs of transmitting antenna elements 199b and receiving antenna elements 199a as shown in Tables 1 and 2. In one embodiment, the actual number of antenna elements 199a and/or 199b, and the switching pattern may be defined in upper layer specifications in AoD transmitter of transmitting device 304.

Transmitting device antenna configuration information for calculating AoA and/or AoD may be transmitted in other (upper layer) packets from transmitting BLE device 304 to upper layers (application layer 210, host layer 220) of receiving BLE device 302. Such device antenna configuration information may include, for example, antenna element spacing or spatial x, y, z coordinate positions of each antenna element 199 of transmit antenna array 197, radiation pattern, antenna array switching information used to transmit signal 307 (e.g., switching pattern or sequence of elements $199b_1$, $199b_2$, $199b_3$ and $199b_4$ used by switch 195b during transmission), orientation vector of transmitting BLE device 304 and its antenna array 197b while transmitting RF signal 307, etc. In this regard, a reference vector ($\vec{n2}$) may be defined as desired to extend relative to the BLE device 304 in order to correspond to, or otherwise indicate, the current orientation of a transmitting BLE device 304 as shown. In this regard, transmitting BLE device 304 may also include one or more sensors to allow BLE device 302 to determine its orientation relative to gravity and magnetic North in real time while transmitting signal 307. Examples of such sensors shown in FIG. 3 include accelerometer sensor 475 that may be used to determine the orientation of device 304 relative to gravity (e.g., up versus down or elevation angle), and magnetometer 477 that may be used to determine the orientation of device 304 relative to magnetic North (e.g., compass bearing or azimuth).

Still referring to FIG. 3, receiving BLE device 302 may measure phase and/or amplitude of the received signal 307 at antenna array 197a, and may determine the above-mentioned transmit antenna array configuration information included in packet/s 400 of RF signal 307, e.g., transmit array switching information, transmitting device/array orientation, etc. A phase shift of constant frequency signal portion 410 that occurs during transmission of signal 307 may also be measured by BLE device 302. This phase shift of signal transmitted from transmitting elements $199b_1$, $199b_2$, $199b_3$ and $199b_4$ is indicative of the vector ($\vec{v1}$) of the transmitted signal 307 relative to a reference vector ($\vec{n2}$) which may be used to define the orientation of transmitting device 304 and from which AoD ($\theta$) from transmitting device 304 may be determined by receiving device 302.

In one exemplary embodiment, AoD ($\theta$) of signal 307 received from receiving device 302 may be determined by BLE controller 230 of receiving device 302, e.g., by measuring the received signal phase shift ($\varphi$) or TDOA at one or more elements of antenna array 197a. Then BLE controller 230 of receiving device 302 may compute the transmitted AoD ($\theta$) of signal 307 transmitted from wireless transmitting device 304, e.g., such as by solving for AoD ($\theta$) using the below relationship together with measured RSSI or distance (d) and wavelength ($\lambda$) of signal 307.

$$\theta = \cos^{-1}\left(\frac{\varphi \lambda}{2\pi d}\right)$$

The computed AoA ($\theta$) may then be provided from BLE controller 230 to host layer 230 as shown in FIG. 3 and is represents the angle between vector ($\vec{v1}$) of signal 307 and orientation (reference vector ($\vec{n2}$)) of transmitting device 304. Since direction of vector ($\vec{v1}$) of signal 307 is known from calculated AoA ($\alpha$) of signal 307 received at receiving device 302, the orientation (reference vector ($\vec{n2}$)) of transmitting device 304 may be calculated based on the offset of the determined AoA ($\theta$) from the known vector ($\vec{v1}$) of signal 307.

Additional information and examples regarding AoA and AoD determination may be found in U.S. patent application Ser. No. 15/387,004 filed on Dec. 21, 2016, which is incorporated herein by reference in its entirety for all purposes.

FIG. 5 illustrates one exemplary embodiment in which multiple antenna elements 199a of a wireless receiving device 302 is receiving a signal 307a that is transmitted from multiple antenna elements 199b of a wireless transmitting device 304a that is separated from receiving device 302 by a distance (d) which may be determined or measured by wireless receiving device, for example, based on received signal strength indicator (RSSI) of received signal 307a measured by wireless receiving device 302. As shown in FIG. 5, RF signal 307a is transmitted along a vector ($\vec{v1}$) from transmitting wireless device 304a at an AoD ($\theta_1$) measured relative to a reference vector ($\vec{n2}$) that defines the orientation of transmitting device 304a. Wireless receiving device 302 is receiving RF signal 307 at an AoA ($\alpha_1$) measured relative to reference vector ($\vec{n1}$) that defines the orientation of receiving device 302.

Also shown in FIG. 5 are at least two other transmitting wireless devices 304b and 304c (antenna elements not shown) which are transmitting respective RF signals 307b and 307c along vectors ($\vec{v2}$) and ($\vec{v3}$), respectively. Vectors ($\vec{v2}$) and ($\vec{v3}$) are measured relative to each of respective reference vectors ($\vec{n3}$) and ($\vec{n4}$) that define the orientation of transmitting devices 304b and 304c, respectively. As shown, vectors ($\vec{v2}$) and ($\vec{v3}$) are received at respective AoAs ($\alpha_2$) and ($\alpha_3$) measured relative to reference vector ($\vec{n1}$).

As previously described, position of each AoD transmitting device 304a, 304b and 304c may be known by the receiving wireless device 302 (e.g., as indoor three-dimensional x, y, z position within a building, geolocation or other location information that is pre-stored in the receiving wireless device memory or that may alternatively be transmitted in packet/s to the receiving wireless device from each transmitting wireless device). The receiving wireless device 302 may also determine the AoD vectors ($\vec{v1}$), ($\vec{v2}$) and ($\vec{v3}$) at which direction each respective receiving wireless device 304a, 304b and 304c is in relation to the transmitting wireless device 302. Using this information, the position (e.g., three-dimensional indoor position or geolocation position) of the receiving wireless device 302 may be determined (e.g., by programmed logic of application layer 210 or host layer 220 of CPU 150) as the intersection point of these determined AoD vectors. Determined AoAs ($\alpha_1$), ($\alpha_2$) and ($\alpha_3$) for the received signals 307a, 307b and 307c may also be determined (e.g., by programmed logic of application layer 210 or host layer 220 of CPU 150) of the receiving wireless device 302 and then combined with the determined position of the receiving wireless device to solve for reference vector ($\vec{n1}$) of receiving wireless device 302 and thus determine the orientation of the receiving wireless device, e.g., relative to transmitting wireless device/s 304 or geolocations of transmitting wireless devices 304.

Figure 6:
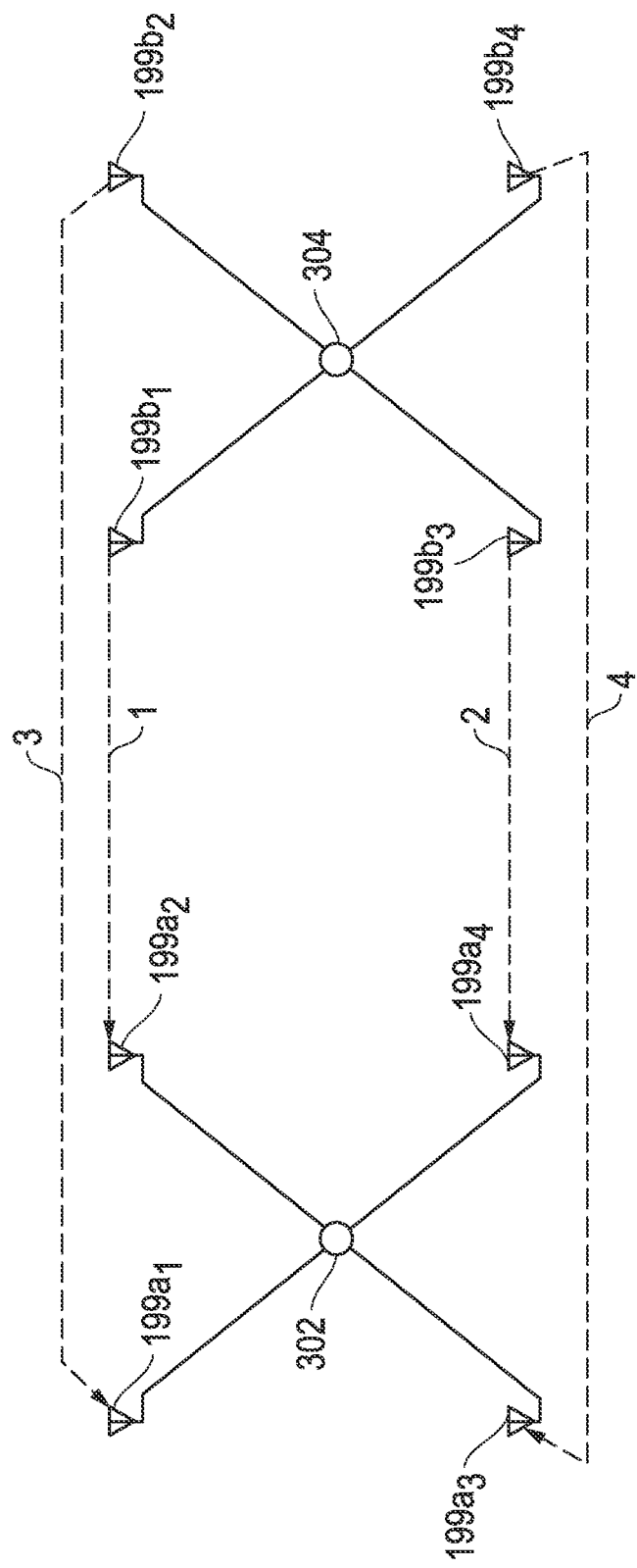
FIG. 6 illustrates multiple antenna elements of a wireless receiving device that is receiving a RF signal 307 from multiple antenna elements of a wireless transmitting device according to one exemplary embodiment of the disclosed systems and methods.

FIG. 6 illustrates one exemplary synchronization pattern between switched transmitting times of each transmitting antennal element 199b and corresponding switched listening times of each receiving antenna element 199a during transmission of constant frequency signal 410 in the supplemental information field of packet 400 of signal 307. In the example of FIG. 6, only one of transmitting elements 199b transmits at any given time, while only one of receiving elements 199a listens at any given time during transmission of constant frequency signal 410. As shown in FIG. 6, receiving element $199a_2$ listens during internal 1 during which transmitting element $199b_1$ transmits, receiving element $199a_1$ listens during interval 2 while transmitting element $199b_2$ transmits, receiving element $199a_3$ listens during interval 3 while transmitting element $199b_4$ transmits, and receiving element $199a_4$ listens during interval 4 while transmitting element $199b_4$ transmits. Receiving wireless device 302 is at the same time aware of the antenna configuration of each of receiving antenna array 197a and transmitting antenna array 197b (e.g., via transmitted antenna configuration received from transmitting wireless device 304). Using this information, phase may be measured at each receiving antenna element 199a from each of the transmitting antenna elements 199b. Since configuration of both receiving antenna array 197a and transmitting antenna array 197b are known, it is possible to calculate both direction to wireless device 304 (from AoA of received signal 307) and orientation of transmitting wireless device 304 (from AoD of transmitted signal 307 and calculated AoA of transmitted signal 307) from known antenna configuration and phase of signal 307 as previously described.

It will be understood that the embodiments described above in relation to FIGS. 1-6 may be implemented in a variety of different wireless communication modes. For example, in just one exemplary embodiment, one or more advertiser (or broadcaster) devices 304 may communicate via advertising packets 400 with one or more scanner (or observer) devices 302. In case of beacon devices and observers devices, no connection may be formed between a beacon broadcaster device 304 that transmits non-connectable advertising events as packets 400 to one or more given receiving observer devices 302. In an alternate example, an advertiser device 304 may transmit connectable advertising events as packets 400 to one or more scanner devices 302, after which the advertiser device 304 may become connected to a scanner 302 as a slave to master in a BLE connection mode. Before such a BLE connection is formed, the scanning device 302 may be configured to communicate with the one or more advertiser devices 304—also simultaneously. In either case, advertiser (or broadcaster) devices 304 may periodically, at pseudo-random intervals, pass advertisement packets 400 which a scanner (or observer) device 302 is scanning to let the scanning or observer device 302 know about the advertiser or broadcaster devices 304.

With regard to the above exemplary advertiser-scanner embodiment, example advertisement packet types that may be transmitted from an advertiser device include:

ADV_IND connectable and scannable undirected advertising event

ADV_DIRECT_IND connectable directed advertising event

ADV_NONCONN_IND non-connectable or non-scannable undirected advertising event

ADV_SCAN_IND scannable undirected (non-connectable) advertising event.

Example types of response packets that may be transmitted by a scanning device in response to received advertisement packets of the advertising device include:

SCAN_REQ scan request for further information from advertiser

CONNECT_REQ connect request.

If the advertiser device sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device. Pairing with short term key exchange is normally required to occur before bonding between the devices may occur the first time. Exchange of long term keys or other encryption information for bonding may then occur during the paired connection. Once a master device and slave device have exchanged long term keys or other encryption info, a master device may request bonding directly with the slave device without requiring pairing first.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

The state for passing advertising packets is called "advertising state" and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Embodiments of the disclosed systems and methods may implement BLE wireless communication according to one or more BLE specifications such as Bluetooth 4.x (e.g., Bluetooth 4.0, 4.1, 4.2) core version specifications, Bluetooth 5 core version specification, addendums and supplements thereto, etc. that are available from the Bluetooth Special Interest Group (SIG). However, it will be understood that the above described BLE embodiments are exemplary only, and that the systems and methods described in relation to FIGS. 1-6 may be implemented for non-BLE wireless protocol communication, and/or may be implemented to transmit packets other than BLE packets between two BLE wireless devices.

It will also be understood that one or more of the tasks, functions, or methodologies described herein for a radio module or radio device (e.g., including those described herein for module segment 110 and module segment 120 of FIG. 1 including CPU 150, BLE controller 230 (e.g., baseband 234), etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such programmable integrated circuits may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
  receiving a first wireless signal transmitted from a transmitter of a second wireless device at each of multiple antenna elements of a first wireless device while switching reception between the multiple antenna elements one at a time so that a receiver of the first wireless device is connected by a switch to only one of the antenna elements of the first wireless device to receive the first wireless signal at the same time at least one switch disconnects the receiver from receiving the wireless signal from the remainder of the antenna elements of the first wireless device at any given time that the first wireless signal is received at the first wireless device, the second wireless device being separate and different from the first wireless device and being positioned at a separate location from the first wireless device, and the first wireless signal being transmitted directly from the second wireless device to the first wireless device along a linear vector that extends across the entire distance from the second wireless device to the first wireless device; and
  determining an angle of departure (AoD) of the first wireless signal from the second wireless device based on one or more characteristics of the first wireless signal as it is transmitted by multiple different antenna elements of the second wireless device and received by the receiver at only a single connected first one of the antenna elements of the first wireless device, and not based on characteristics of the first wireless signal as it is received at any other of the antenna elements of the first wireless device, while performing the switching reception between the multiple antenna elements of the first wireless device one at a time;

where the first wireless signal is transmitted from the multiple different antenna elements of the second wireless device one at a time during multiple different corresponding transmit time slots; and where the method further comprises switching reception of the first wireless signal between the multiple different antenna elements of the first wireless device during multiple different receive time slots that are synchronized with the transmit time slots of the second wireless device.

2. The method of claim 1, where the first wireless signal is transmitted from the multiple different antenna elements of the second wireless device during the multiple different corresponding transmit time slots according to a round-robin sequence that repeatedly cycles through the different multiple antenna elements of the second wireless device in the same order during each cycle of the round-robin sequence to transmit from only one antenna element of the second wireless device at a time during each time slot; and where the method further comprises switching reception of the first wireless signal between the multiple different antenna elements of the first wireless device during the multiple different corresponding receive time slots so that the receiver is connected by a switch to only one antenna element of the first wireless device at a time during each given receive time slot to receive the first wireless signal transmitted from only one of the multiple different antenna elements of the second wireless device during the given receive time slot at the same time at least one switch disconnects the receiver from receiving the wireless signal from the remainder of the antenna elements during the given receive time slot.

3. The method of claim 1, where the first wireless signal is transmitted from the multiple different antenna elements of the second wireless device during the multiple different corresponding transmit time slots of the second wireless device according to a round-robin sequence that repeatedly cycles through the different multiple antenna elements of the second wireless device in the same order during each cycle of the round-robin sequence to transmit from only one antenna element of the second wireless device at a time during each transmit time slot of the second wireless device; and where the method further comprises switching reception of the first wireless signal between the multiple different antenna elements of the first wireless device so that the receiver is connected by a switch to only one antenna element of the first wireless device to receive the first wireless signal at any given time and such that the receiver is connected by a switch to each of the different antenna elements of the first wireless devices to receive the first wireless signal during a same single transmit time slot of the second wireless device, each of the multiple antenna elements of the first wireless device receiving the first wireless signal from a single one of the multiple antenna elements of the second wireless device during the same single transmit time slot of the second wireless device.

4. The method of claim 1, where the first wireless signal is transmitted from the multiple different antenna elements of the second wireless device during multiple different corresponding transmit time slots of the second wireless device according to a round-robin sequence that repeatedly cycles through the different multiple antenna elements of the second wireless device in the same order during each cycle of the round-robin sequence to transmit from only one antenna element of the second wireless device at a time during each transmit time slot of the second wireless device; and where the method further comprises switching reception of the first wireless signal between multiple different antenna elements of the first wireless device so that the receiver is connected by a switch to only one antenna element of the first wireless device to receive the first wireless signal at any given time and so that the receiver is connected by at least one switch to each of the antenna elements of the first wireless device to receive the first wireless signal from a common one of the multiple different antenna elements of the second wireless device during a different transmit time slot of the second wireless device that is separate and different from transmit time slots during which the receiver is connected by at least one switch to each of the other antenna elements of the first wireless device to receive the first wireless signal from the common one of the multiple different antenna elements of the second wireless device.

5. The method of claim 1, further comprising simultaneously determining the angle of departure (AoD) of the first wireless signal from the second wireless device and an angle of arrival (AoA) of the first wireless signal at the first wireless device to determine the orientation of the second wireless device by:

simultaneously determining the angle of departure (AoD) of the first wireless signal as transmitted from the second wireless device based on one or more characteristics of the received first wireless signal, and determining the angle of arrival (AoA) of the first wireless signal at the first wireless device based on one or more characteristics of the first wireless signal as received at the first wireless device;

determining direction of the second wireless device relative to the first wireless device from the determined AoA; and determining an orientation of the second wireless device from the determined AoD.

6. The method of claim 1, further comprising:

receiving a second wireless signal from a third wireless device at the multiple antenna elements of the first wireless device while switching reception between the multiple antenna elements one at a time so that the receiver is connected by a switch to only one antenna element of the first wireless device to receive the second wireless signal at any given time and such that the receiver is connected by at least one switch to each of the different antenna elements of the first wireless device to receive the second wireless signal received at the first wireless device;

receiving a third wireless signal from a fourth wireless device at the multiple antenna elements of the first wireless device while switching reception between the multiple antenna elements one at a time so that the receiver is connected by a switch to only one antenna element of the first wireless device to receive the third wireless signal at any given time and such that the receiver is connected by a switch to each of the different antenna elements of the first wireless device to receive the third wireless signal received at the first wireless device;

determining an angle of departure (AoD) of the second wireless signal from the third wireless device based on one or more characteristics of the second wireless signal received while switching reception between the multiple antenna elements of the first wireless device one at a time;

determining an angle of departure (AoD) of the third wireless signal from the fourth wireless device based on one or more characteristics of the third wireless signal received while switching reception between the multiple antenna elements of the first wireless device one at a time; and determining a position of the first wireless device from the determined angle of departure (AoD) values for each of the first, second and third wireless signals and known positions of each of the second, third and fourth wireless devices.

7. The method of claim 6, further comprising:

determining an angle of arrival (AoA) of the second wireless signal at the first wireless device based on one or more characteristics of the received second wireless signal received while switching reception between the multiple antenna elements of the first wireless device one at a time;

determining an angle of arrival (AoA) of the third wireless signal at the first wireless device based on one or more characteristics of the received third wireless signal received while switching reception between the multiple antenna elements of the first wireless device one at a time;

and determining an orientation of the first wireless device from the determined angle of arrival (AoA) values for each of the first, second and third wireless signals and the determined position of the first wireless device.

8. The method of claim 1, where the first wireless signal is non-simultaneously transmitted by transmitter circuitry at each of the multiple different antenna elements of the second wireless device one at a time relative to each other during multiple different corresponding transmit time slots that are defined and controlled by the transmitter circuitry of the second wireless device; where the first wireless signal comprises a data packet containing slot switching times for the data transmission transmit time slots used to control transmission of the first wireless signal by the multiple antenna elements of the second wireless device; and where the method further comprises using the transmit time slot switching times of the received data packet to synchronize switching between each of the multiple different antenna elements of the first wireless device used to receive the first wireless signal with the transmit slot switching times used to control transmission of the first wireless signal by the multiple antenna elements of the second wireless device so that the first wireless signal is received from each of the multiple different antenna elements of the second wireless device by the single connected one of the antenna elements of the first wireless device.

9. The method of claim 1, further comprising simultaneously determining the angle of departure (AoD) of the first wireless signal from the second wireless device and an angle of arrival (AoA) of the first wireless signal at the first wireless device while there is no cooperation between the second wireless device and the first wireless device.

10. The method of claim 1, further comprising simultaneously determining the angle of departure (AoD) of the first wireless signal from the second wireless device and an angle of arrival (AoA) of the first wireless signal at the first wireless device while a user of the first wireless device has no control over a signal transmission mode of the second wireless device.

11. An apparatus, comprising at least one processing device coupled to radio circuitry and configured to be coupled to multiple antenna elements as a first wireless device, the at least one processing device being programmed to control the first wireless device to:

receive a first wireless signal transmitted from a transmitter of a second wireless device at each of the multiple antenna elements of the first wireless device while switching reception between the multiple antenna elements of the second wireless device one at a time so that a receiver of the first wireless device is connected by a switch to only one of the antenna elements of the first wireless device to receive the first wireless signal at the same time at least one switch disconnects the receiver from receiving the wireless signal from the remainder of the antenna elements of the first wireless device are disconnected by a switch from receiving at any given time that the first wireless signal is received at the first wireless device, the second wireless device being separate and different from the first wireless device and being positioned at a separate location from the first wireless device, and the first wireless signal being transmitted directly from the second wireless device to the first wireless device along a linear vector that extends across the entire distance from the second wireless device to the first wireless device; and determine an angle of departure (AoD) of the first wireless signal from the second wireless device based on one or more characteristics of the first wireless signal as it is transmitted by multiple different antenna elements of the second wireless device and received by the receiver at only a single connected first one of the antenna elements of the first wireless device, and not based on characteristics of the first wireless signal as it is received at any other of the antenna elements of the first wireless device, while performing the switching reception between the multiple antenna elements of the first wireless device one at a time;

where the first wireless signal is transmitted from the multiple different antenna elements of the second wireless device one at a time during multiple different corresponding transmit time slots; and where the at least one processing device is programmed to control the first wireless device to switch reception of the first wireless signal between the multiple different antenna elements of the first wireless device during multiple different receive time slots that are synchronized with the transmit time slots of the second wireless device.

12. The apparatus of claim 11, where the at least one processing device is further programmed to switch reception of the first wireless signal between multiple different antenna elements of the first wireless device during the multiple different corresponding receive time slots so that the receiver is connected by a switch to only the first antenna element of the first wireless device at a time during each given receive time slot to receive the first wireless signal transmitted from only one of the multiple different antenna elements of the second wireless device during the given receive time slot at the same time at least one switch disconnects the receiver from receiving the wireless signal from the remainder of the antenna elements during the given receive time slot so that the first wireless signal is received from each of the multiple different antenna elements of the second wireless device by the first one of the antenna elements of the first wireless device.

13. A method, comprising:

using a transmitter of a second wireless device to transmit a first wireless signal from multiple different antenna elements of a second wireless device during multiple different corresponding transmit time slots according to a round-robin sequence that repeatedly cycles through the different multiple antenna elements of the second wireless device in the same order during each cycle of the round-robin sequence to transmit from only one antenna element of the second wireless device at a time during each transmit time slot, the first wireless signal being transmitted directly from the second wireless device to the first wireless device along a linear vector that extends across the entire distance from the second wireless device to the first wireless device;

receiving the first wireless signal from the second wireless device at each of multiple antenna elements of a first wireless device while switching reception between the multiple antenna elements of the first wireless device one at a time during multiple different receive time slots that are synchronized with the transmit time slots of the second wireless device so that a receiver of the first wireless device is connected by a switch to only one of the antenna elements of the first wireless device to receive the first wireless signal at the same time at least one switch disconnects the receiver from receiving the wireless signal from the remainder of the antenna elements of the first wireless device at any given time that the first wireless signal is received at the first wireless device, the second wireless device being separate and different from the first wireless device and being positioned at a separate location from the first wireless device; and determining an angle of departure (AoD) of the first wireless signal from the second wireless device based on one or more characteristics of the first wireless signal as it is transmitted by the multiple different antenna elements of the second wireless device and received by the receiver at only a connected first one of the antenna elements of the first wireless device, and not based on characteristics of the first wireless signal as it is received at any other of the antenna elements of the first wireless device, while performing the switching reception between the multiple antenna elements of the first wireless device one at a time;

where the method further comprises transmit time slot switching times from the second wireless device to the first wireless device, and using the time slot switching times to synchronize the receive time slots of the first wireless device with the transmit time slots of the second wireless device by controlling synchronized switching between the respective multiple antenna elements of the first wireless device in time alignment with switching between the respective multiple antenna elements of the second wireless device.

14. The method of claim 13, further comprising switching reception of the first wireless signal between the multiple different antenna elements of the first wireless device during multiple different corresponding receive time slots so that the receiver is connected by a switch to only one antenna element of the first wireless device at a time during each given receive time slot to receive the first wireless signal transmitted from only one of the multiple different antenna elements of the second wireless device during the given receive time slot at the same time at least one switch disconnects the receiver from receiving the wireless signal from the remainder of the antenna elements during the given receive time slot so that the first wireless signal is received from each of the multiple different antenna elements of the second wireless device by the first one of the antenna elements of the first wireless device.

15. The method of claim 13, further comprising switching reception of the first wireless signal between multiple different antenna elements of the first wireless device so that the receiver is connected by a switch to only one antenna element of the first wireless device to receive the first wireless signal at any given time and such that the receiver is connected by a switch to each of the different antenna elements of the first wireless device to receive the first wireless signal during a same single transmit time slot of the second wireless device, each of the multiple antenna elements of the first wireless device receiving the first wireless signal from a single one of the multiple transmitting elements during the same single transmit time slot of the second wireless device.

16. The method of claim 13, further comprising switching reception of the first wireless signal between multiple different antenna elements of the first wireless device so that the receiver is connected by a switch to only one antenna element of the first wireless device to receive the first wireless signal at any given time and so that the receiver is connected by at least one switch to each of the antenna elements of the first wireless device to receive the first wireless signal from a common one of the multiple different antenna elements of the second wireless device during a transmit time slot of the second wireless device that is separate and different from transmit time slots during which the receiver is connected by at least one switch to each of the other receiving antenna elements of the first wireless device to receive the first wireless signal from the common one of the multiple different antenna elements of the second wireless device.

17. The method of claim 13, further comprising simultaneously determining the angle of departure (AoD) of the first wireless signal from the second wireless device and an angle of arrival (AoA) of the first wireless signal at the first wireless device to determine the orientation of the second wireless device by:
   simultaneously determining the angle of departure (AoD) of the first wireless signal as transmitted from the second wireless device based on one or more characteristics of the received first wireless signal, and determining the angle of arrival (AoA) of the first wireless signal at the first wireless device based on one or more characteristics of the first wireless signal as received at the first wireless device;
   determining direction of the second wireless device relative to the first wireless device from the determined AoA; and
   determining an orientation of the second wireless device from the determined AoD.

18. The method of claim 13, further comprising:
   transmitting a second wireless signal from multiple different antenna elements of a third wireless device during multiple different corresponding transmit time slots of the third wireless device according to a round-robin sequence that repeatedly cycles through the different multiple antenna elements of the third wireless device in the same order during each cycle of the round-robin sequence to transmit the second wireless signal from only one antenna element of the third wireless device at a time during each transmit time slot of the third wireless device;
   transmitting a third wireless signal from multiple different antenna elements of a fourth wireless device during multiple different corresponding transmit time slots of the fourth wireless device according to a round-robin sequence that repeatedly cycles through the different multiple antenna elements of the fourth wireless device in the same order during each cycle of the round-robin sequence to transmit the third wireless signal from only one antenna element of the fourth wireless device of the fourth wireless device at a time during each transmit time slot of the fourth wireless device;

receiving the second wireless signal from the third wireless device at the multiple antenna elements of the first wireless device while switching reception between the multiple antenna elements one at a time so that the receiver is connected by a switch to only one antenna element of the first wireless device to receive the second wireless signal at any given time and such that the receiver is connected by at least one switch to each of the different antenna elements of the first wireless device to receive the second wireless signal received at the first wireless device;

receiving the third wireless signal from the fourth wireless device at the multiple antenna elements of the first wireless device while switching reception between the multiple antenna elements one at a time so that the receiver is connected by a switch to only one antenna element of the first wireless device to receive the third wireless signal at any given time and such that the receiver is connected by a switch to each of the different antenna elements of the first wireless device to receive the third wireless signal received at the first wireless device;

determining an angle of departure (AoD) of the second wireless signal from the third wireless device based on one or more characteristics of the second wireless signal received while switching reception between the multiple antenna elements of the first wireless device one at a time;

determining an angle of departure (AoD) of the third wireless signal from the fourth wireless device based on one or more characteristics of the third wireless signal received while switching reception between the multiple antenna elements of the first wireless device one at a time; and determining a position of the first wireless device from the determined angle of departure (AoD) values for each of the first, second and third wireless signals and known positions of each of the second, third and fourth wireless devices.

19. The method of claim 18, further comprising:

determining an angle of arrival (AoA) of the second wireless signal at the first wireless device based on one or more characteristics of the received second wireless signal received while switching reception between the multiple antenna elements of the first wireless device one at a time;

determining an angle of arrival (AoA) of the third wireless signal at the first wireless device based on one or more characteristics of the received third wireless signal received while switching reception between the multiple antenna elements of the first wireless device one at a time;

and determining an orientation of the first wireless device from the determined angle of arrival (AoA) values for each of the first, second and third wireless signals and the determined position of the first wireless device.

20. A system, comprising a first apparatus including at least one processing device coupled to radio circuitry that is coupled to multiple antenna elements as a first wireless device; and a second apparatus including at least one processing device coupled to radio circuitry that is coupled to multiple antenna elements as a second wireless device, the at least one processing device of the second apparatus being programmed to control a transmitter of the second wireless device to transmit a first wireless signal from multiple different antenna elements of the second wireless device during multiple different corresponding transmit time slots according to a round-robin sequence that repeatedly cycles through the different multiple antenna elements to transmit from only one antenna element of the second wireless device at a time during each transmit time slot, the second wireless device being separate and different from the first wireless device and being positioned at a separate location from the first wireless device, and the first wireless signal being transmitted directly from the second wireless device to the first wireless device along a linear vector that extends across the entire distance from the second wireless device to the first wireless device; and where the at least one processing device of the first wireless device is programmed to control the first wireless device to:

receive the first wireless signal from the second wireless device at each of the multiple antenna elements of the first wireless device while switching reception between the multiple antenna elements of the first wireless device one at a time during multiple different receive time slots that are synchronized with the transmit time slots of the second wireless device so that a receiver of the first wireless device is connected by a switch to only one of the antenna elements of the first wireless device to receive the first wireless signal at the same time at least one switch disconnects the receiver from receiving the wireless signal from the remainder of the antenna elements of the first wireless device at any given time that the first wireless signal is received at the first wireless device; and determine an angle of departure (AoD) of the first wireless signal from the second wireless device based on one or more characteristics of the first wireless signal as it is transmitted by the multiple different antenna elements of the second wireless device and received by the receiver at only a single connected first one of the antenna elements of the first wireless device, and not based on characteristics of the first wireless signal as it is received at any other of the antenna elements of the first wireless device, while performing the switching reception between the multiple antenna elements of the first wireless device one at a time; and where the at least one processing device of the second apparatus is programmed to control a transmitter of the second wireless device to transmit time slot switching times from the second wireless device to the first wireless device, and where the at least one processing device of the first wireless device is programmed to control the first wireless device to use the transmitted time slot switching times to synchronize the receive time slots of the first wireless device with the transmit time slots of the second wireless device by controlling synchronized switching between the respective multiple antenna elements of the first wireless device in time alignment with switching between the respective multiple antenna elements of the second wireless device.

21. The system of claim 20, where the at least one processing device of the first wireless device is programmed to control the first wireless device to at least one of:
switch reception of the first wireless signal between multiple different antenna elements of the first wireless device during multiple different corresponding receive time slots so that the receiver is connected by a switch to only the first antenna element of the first wireless device at a time during each given receive time slot to receive the first wireless signal transmitted from only one of the multiple different antenna elements of the second wireless device during the given receive time slot at the same time at least one switch disconnects the receiver from receiving the wireless signal from the remainder of the antenna elements during the given receive time slot so that the first wireless signal is received from each of the multiple different antenna elements of the second wireless device by the first one of the antenna elements of the first wireless device; or
switch reception of the first wireless signal between multiple different antenna elements of the first wireless device so that the receiver is connected by a switch to only one antenna element of the first wireless device to receive the first wireless signal at any given time and such that the receiver is connected by a switch to each of the different antenna elements of the first wireless device to receive the first wireless signal during a same single transmit time slot of the second wireless device, each of the multiple antenna elements of the first wireless device receiving the first wireless signal from a single one of the multiple antenna elements of the second wireless device during the same single transmit time slot; or
switch reception of the first wireless signal between multiple different antenna elements of the first wireless device so that the receiver is connected by a switch to only one antenna element of the first wireless device to receive the first wireless signal at any given time and so that the receiver is connected by at least one switch to each of the antenna elements of the first wireless device to receive the first wireless signal from a common one of the multiple different elements of the second wireless device during a receive time slot that is separate and different from receive time slots during which the receiver is connected by at least one switch to each of the other antenna elements of the first wireless device to receive the first wireless signal from the common one of the multiple different antenna elements of the second wireless device.

22. The system of claim 20, where the at least one processing device of the first wireless device is programmed to control the first wireless device to simultaneously determine the angle of departure (AoD) of the first wireless signal from the second wireless device and an angle of arrival (AoA) of the first wireless signal at the first wireless device to determine the orientation of the second wireless device by:
simultaneously determining the angle of departure (AoD) of the first wireless signal as transmitted from the second wireless device based on one or more characteristics of the received first wireless signal, and determining an angle of arrival (AoA) of the first wireless signal at the first wireless device based on one or more characteristics of the first wireless signal as received at the first wireless device;
determining direction of the second wireless device relative to the first wireless device from the determined AoA; and
determining an orientation of the second wireless device from the determined AoD.

23. The system of claim 20, further comprising:
a third apparatus including at least one processing device coupled to radio circuitry that is coupled to multiple antenna elements as a third wireless device, the at least one processing device of the third apparatus being programmed to control the third wireless device to transmit a second wireless signal from the multiple different antenna elements of the third wireless device during multiple different corresponding transmit time slots of the third wireless device according to a round-robin sequence that repeatedly cycles through the different multiple antenna elements of the third wireless device in the same order during each cycle of the round-robin sequence to transmit the second wireless signal from only one antenna element of the third wireless device at a time during each transmit time slot of the third wireless device; and
a fourth apparatus including at least one processing device coupled to radio circuitry that is coupled to multiple antenna elements as a fourth wireless device, the at least one processing device of the fourth apparatus being programmed to control the fourth wireless device to transmit a third wireless signal from the multiple different antenna elements of the fourth wireless device during multiple different corresponding transmit time slots of the fourth wireless device according to a round-robin sequence that repeatedly cycles through the different multiple antenna elements of the fourth wireless device in the same order during each cycle of the round-robin sequence to transmit the third wireless signal from only one antenna element of the fourth wireless device at a time during each transmit time slot of the third wireless device;
where the at least one processing device of the first apparatus is further programmed to:
receive the second wireless signal from the third wireless device at the multiple antenna elements of the first wireless device while switching reception between the multiple antenna elements one at a time so that the receiver is connected by a switch to only one antenna element of the first wireless device to receive the second wireless signal at any given time and such that the receiver is connected by at least one switch to each of the different antenna elements of the first wireless device to receive the second wireless signal received at the first wireless device;
receive the third wireless signal from the fourth wireless device at the multiple antenna elements of the first wireless device while switching reception between the multiple antenna elements one at a time so that the receiver is connected by a switch to only one antenna element of the first wireless device to receive the third wireless signal at any given time and such that the receiver is connected by a switch to each of the different antenna elements of the first wireless device to receive the third wireless signal received at the first wireless device;
determine an angle of departure (AoD) of the second wireless signal from the third wireless device based on one or more characteristics of the second wireless signal received while switching reception between the multiple antenna elements of the first wireless device one at a time;

determine an angle of departure (AoD) of the third wireless signal from the fourth wireless device based on one or more characteristics of the third wireless signal received while switching reception between the multiple antenna elements of the first wireless device one at a time; and determine a position of the first wireless device from the determined angle of departure (AoD) values for each of the first, second and third wireless signals and known positions of each of the second, third and fourth wireless devices.

24. The system of claim 23, where the at least one processing device of the first apparatus is further programmed to:

determine an angle of arrival (AoA) of the second wireless signal at the first wireless device based on one or more characteristics of the received second wireless signal received while switching reception between the multiple antenna elements of the first wireless device one at a time; and determine an angle of arrival (AoA) of the third wireless signal at the first wireless device based on one or more characteristics of the received third wireless signal received while switching reception between the multiple antenna elements of the first wireless device one at a time;

and determine an orientation of the first wireless device from the determined angle of arrival (AoA) values for each of the first, second and third wireless signals and the determined position of the first wireless device.

25. A method, comprising:

receiving a first wireless signal transmitted from multiple different antenna elements of a second wireless device at multiple antenna elements of a first wireless device while switching reception between the multiple antenna elements one at a time during multiple different receive time slots and during at least a portion of a time duration of the reception of the first wireless signal so as to receive the first wireless signal from only one of the multiple different antenna elements of the second wireless device at each of the multiple antenna elements of the first wireless device; and determining an angle of arrival (AoA) of the first wireless signal at the first wireless device based on one or more characteristics of the first wireless signal as it is received from only one of the multiple different antenna elements of the second wireless device at each of the multiple antenna elements of the first wireless device;

where the first wireless signal is transmitted from the second wireless device in an angle of departure (AoD) transmitting mode from the multiple different antenna elements of the second wireless device during multiple different transmit time slots according to a round-robin sequence that repeatedly cycles through the multiple antenna elements of the second wireless device to transmit from one antenna element of the second wireless device at a time; and where the method further comprises synchronizing the multiple different receive time slots with the multiple different transmit time slots of the second wireless device.

26. A method, comprising:

operating a second wireless device in an angle of departure (AoD) transmitting mode to transmit a first wireless signal from multiple different antenna elements of the second wireless device during multiple different time transmit slots according to a round-robin sequence that repeatedly cycles through the multiple antenna elements of the second wireless device to transmit from one antenna element of the second wireless device at a time;

receiving the first wireless signal transmitted in AoD transmitting mode from the multiple different antenna elements of the second wireless device at multiple antenna elements of a first wireless device while switching reception between the multiple antenna elements of the first wireless device one at a time during multiple different receive time slots during at least a portion of a time duration of the reception of the first wireless signal transmitted by the multiple different antenna elements of the second wireless device so that a receiver of the first wireless device is connected in sequence by at least one switch to each of the multiple antenna elements of the first wireless device one at a time to receive the first wireless signal at the same time the at least one switch disconnects the receiver from receiving the wireless signal from the remainder of the antenna elements of the first wireless device at any given time that the first wireless signal is received at the first wireless device; and determining an angle of arrival (AoA) of the first wireless signal at the first wireless device based on one or more characteristics of the first wireless signal as received at the first wireless device in sequence at each of the multiple antenna elements of the first wireless device;

where the method further comprises synchronizing the multiple different receive time slots with the multiple different transmit time slots of the second wireless device.

27. The method of claim 13, further comprising providing transmitting device antenna configuration information from the second wireless device to the first wireless device, the transmitting device antenna configuration information comprising at least one of antenna element spacing or spatial x, y, z coordinate positions of each of the multiple different antenna elements of the second wireless device, antenna element switching pattern or sequence of antenna elements of the second wireless device used by the second wireless device during transmission of the first wireless signal, or an orientation vector of the second wireless device during transmission of the first wireless signal.

28. The method of claim 27, where the method further comprises receiving the transmitting device antenna configuration information at the first wireless device from the second wireless device, and determining the AoD of the first wireless signal from the second wireless device based on the transmitting device antenna configuration information received from the second wireless device.

29. The system of claim 20, where the at least one processing device of the second apparatus is programmed to control the transmitter of the second wireless device to provide transmitting device antenna configuration information from the second wireless device to the first wireless device, the transmitting device antenna configuration information comprising at least one of antenna element spacing or spatial x, y, z coordinate positions of each of the multiple different antenna elements of the second wireless device, antenna element switching pattern or sequence of antenna elements of the second wireless device used by the second wireless device during transmission of the first wireless signal, or an orientation vector of the second wireless device during transmission of the first wireless signal.

30. The system of claim 29, where the at least one processing device of the first wireless device is programmed to receive the transmitting device antenna configuration information from the second wireless device, and to determine the AoD of the first wireless signal from the second wireless device based on the transmitting device antenna configuration information received from the second wireless device.

* * * * *